UNITED STATES PATENT OFFICE 2,526,755

TURBINE OIL COMPOSITION

Herman D. Kluge and Edwin C. Knowles, Beacon, N. Y., assignors to The Texas Company, New York, N. Y., a corporation of Delaware No Drawing. Application March 15, 1946, Serial No. 654,823

3 Claims. (Cl. 252—48.2)

This invention relates to a method of retarding the oxidation deterioration of organic materials, such as petroleum products, fatty oils, drying oils, rubber and the like, and to the oxidation resistant products resulting therefrom. In particular, the invention is directed to new and improved anti-oxidants falling within the class of hydroxy aromatic methylene thioethers previously disclosed and claimed in U. S. Patent No. 2,322,376 granted June 22, 1943 to Rush F. McCleary and Stiles M. Roberts as improving agents for lubricating compositions.

It has now been found that the 2-hydroxy-3-tertiary-alkyl-5-methylbenzyl tertiary-alkyl sulfides are particularly effective as oxidation inhibitors and possess the added advantage that they are unusually effective against oxidation deterioration in aqueous systems where the majority of conventional anti-oxidants lose their efficiency. These anti-oxidants may be further described as compounds of the following structural formula

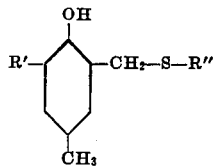

in which R' and R" represent alkyl radicals containing a tertiary carbon atom and, preferably, a tertiary alkyl radical. As representative of the tertiary alkyl radicals contemplated within the scope of the invention may be mentioned tertiary butyl, tertiary amyl, tertiary hexyl, and tertiary alkyl radicals containing more than six carbon atoms.

In general, the anti-oxidants of the invention may be prepared in accordance with any of the conventional methods of synthesis applicable to this type of compound.

As an illustration of one of the methods of preparation the following example is presented:

Equimolar quantities of 4-methyl-2-tertiary-alkyl phenol, formaldehyde (37% solution-formalin), dimethylamine (25% aqueous solution), and alcohol are heated at a gentle reflux for four to eight hours. The reaction mixture is diluted with water, the oily layer extracted with ether, washed several times with water and distilled. The resulting product is 4-methyl-2-tertiary-alkyl-6-dimethylaminomethyl phenol. This compound, together with the appropriate tertiary alkyl mercaptan, is then heated for 100–200 hours at a gentle reflux. The reaction product is then distilled under diminished pressure to isolate the 2-hydroxy-3-tertiary - alkyl - 5 - methylbenzyl tertiary-alkyl sulfide. The reactions involved may be illustrated as follows:

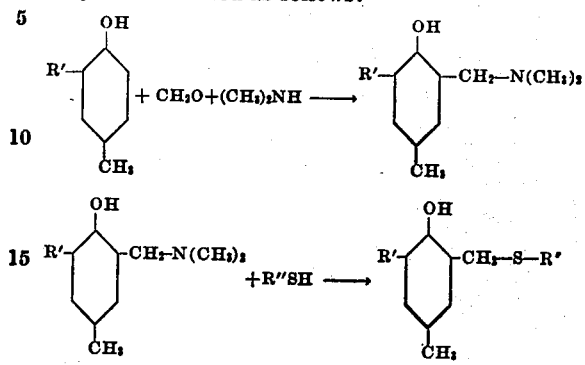

Although these anti-oxidants may be applied to all the organic materials normally susceptible to oxidation deterioration, they are particularly desirable for use in petroleum oils, such as turbine oils, which, under normal conditions of operation, involve oxidation deterioration in the presence of water. The amount of anti-oxidant incorporated in the materials to be inhibited will vary considerably, depending upon the character of the material to be inhibited and the oxidizing conditions to which it is subjected. In the case of the turbine oils the amount of anti-oxidant used may vary from 0.01 to 3% by weight.

The effectiveness of the compounds of the invention as anti-oxidants are demonstrated by the results obtained in the ASTM Turbine Oil Oxidation Test. In this test 300 ccs. of the mineral lubricating oil sample are introduced into an oxidation cell in which are suspended spiral coils of iron and copper, followed by the addition of 60 ccs. of distilled water. Oxygen is introduced through a fritted glass outlet into the oxidation cell at a rate of three liters per hour. The oxidation cell is suspended in a heated oil bath and the temperature in the cell is maintained at a constant temperature of 95° C. During the test samples of the oil are periodically withdrawn to determine the neutralization number and the test is terminated when the neutralization number of the sample reaches 2.0. The number of hours required to reach a neutralization number of 2.0 is indicative of the oxidation resistance of the particular oil sample.

The results set forth in the following table were obtained on a reference oil which was a solvent-refined, acid-treated and filtered mineral lubricating oil within the viscosity range of 485–515 Saybolt Universal seconds at 100° F.

*Oxidation test*

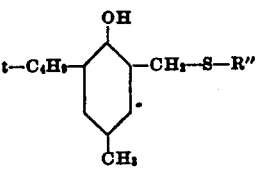

| | Conc., Wt. Per cent | Hrs. to 2.0 Neut. No. |
|---|---|---|
| Reference Oil | | 80 |
| R″=amyl | 0.2 | 390 |
| | 0.4 | 390 |
| | 0.6 | 440 |
| R″=tert.-butyl | 0.2 | 545 |
| | 0.4 | 920 |
| | 0.6 | 1110 |
| R″=tert.-amyl | 0.2 | 640 |
| | 0.4 | 830 |
| | 0.6 | 1090 |
| R″=tert.-hexyl | 0.2 | 600 |
| | 0.4 | 970 |

Obviously many modifications and variations of the invention, as hereinbefore set forth, may be made without departing from the spirit and scope thereof and, therefore only such limitations should be imposed as are indicated in the appended claims.

We claim:

1. A turbine oil comprising a mineral lubricating oil containing about 0.2–0.6% by weight of 2-hydroxy 3-tert.-butyl 5-methyl benzyl tert.-amyl sulfide.

2. A mineral lubricating oil composition comprising as the predominant constituent a lubricating oil normally susceptible to deterioration by oxidation in the presence of water, and about 0.01–3.0% by weight based on the weight of the oil of a 2-hydroxy 3-tert.-butyl 5-methyl benzyl tert.-alkyl sulfide effective to stabilize said oil against said deterioration by oxidation in the presence of water, said tert. alkyl group containing from 4 to 6 carbon atoms.

3. A turbine oil comprising a mineral lubricating oil containing about 0.2–0.6% by weight of 2-hydroxy 3-tert.-butyl 5-methyl benzyl tert.-butyl sulfide.

HERMAN D. KLUGE.
EDWIN C. KNOWLES.

REFERENCES CITED

The following references are of record in the file of this patent:

UNITED STATES PATENTS

| Number | Name | Date |
|---|---|---|
| 2,031,930 | Buc | Feb. 25, 1936 |
| 2,322,376 | McCleary et al. | June 22, 1943 |
| 2,415,833 | Mikeska et al. | Feb. 18, 1947 |